United States Patent [19]

Beierle

[11] Patent Number: 5,512,937
[45] Date of Patent: Apr. 30, 1996

[54] SYSTEM FOR INTEGRATED DISTRIBUTION OF SWITCHED VOICE AND TELEVISION ON COAXIAL CABLE AND WITH VIDEO SIGNAL TRANSMISSION ORIGINATING FROM SUBSCRIBER LOCATIONS

[75] Inventor: John D. Beierle, Danbury, Conn.

[73] Assignee: Nynex Corporation, New York, N.Y.

[21] Appl. No.: 335,184

[22] Filed: Nov. 7, 1994

Related U.S. Application Data

[63] Continuation of Ser. No. 243,530, May 16, 1994, abandoned, which is a continuation of Ser. No. 150,281, Nov. 10, 1993, abandoned, which is a continuation of Ser. No. 815,071, Dec. 30, 1991, abandoned.

[51] Int. Cl.$^6$ ............................ H04M 11/00; H04N 7/12
[52] U.S. Cl. ................ 348/14; 379/90; 455/3.1; 370/49.5
[58] Field of Search ............................ 348/6, 7, 12–14, 348/17, 22, 24; 379/53, 54, 93–98, 90, 110, 105; 455/3.1, 3.2, 5.1, 6.1–6.3, 7; 370/108, 100.1, 49.5; 375/110

[56] References Cited

U.S. PATENT DOCUMENTS

| | | | |
|---|---|---|---|
| 4,386,365 | 5/1983 | Gargini | 379/54 |
| 4,533,943 | 8/1985 | Poirier | 358/85 |
| 4,686,667 | 8/1987 | Ohnsorge . | |
| 4,860,287 | 8/1989 | Kelly | 370/108 |
| 4,893,326 | 1/1990 | Duran et al. | 379/53 |
| 4,901,367 | 2/1990 | Nicholson | 358/86 |
| 4,935,924 | 6/1990 | Baxter | 358/86 |
| 5,027,426 | 6/1991 | Chiocca, Jr. | 358/86 |
| 5,200,989 | 4/1993 | Milone | 379/53 |
| 5,263,021 | 11/1993 | Ortel | 370/74 |
| 5,351,234 | 9/1994 | Beierle et al. | 370/49.5 |

FOREIGN PATENT DOCUMENTS

| | | |
|---|---|---|
| 0386917 | 9/1990 | European Pat. Off. . |
| 1495476 | 12/1977 | United Kingdom . |

*Primary Examiner*—Wing F. Chan
*Attorney, Agent, or Firm*—John R. Berres; John J. Torrente

[57] ABSTRACT

A system for voice and video distribution amongst a plurality of telephone subscriber locations operating on a broadband cable network. The subscriber locations are adapted to establish RF transmitting and receiving channels for carrying voice and signalling information and each further includes a tunable video signal generator and a tunable video signal receiver for coupling video signals to and from subscriber location video RF broadband channels of the cable network. A central switch is also coupled to the cable network and enables each RF transmitting channel to be selectively coupled to any of the RF receiving channels and also enables a particular subscriber location video RF broadband channel to be assigned to a subscriber location.

23 Claims, 12 Drawing Sheets

SYSTEM FOR INTEGRATED DISTRIBUTION OF SWITCHED VOICE AND TELEVISION ON COAXIAL CABLE AND WITH VIDEO SIGNAL TRANSMISSION ORIGINATING FROM SUBSCRIBER LOCATIONS

This is a continuation application under 37 CFR 1.62 of prior application Ser. No. 08/243,530, filed May 16, 1994, abandoned, which is a continuation of Ser. No. 08/150,281, filed Nov. 10, 1993, abandoned, which is a continuation of Ser. No. 07/815,071, filed Dec. 30, 1991, abandoned.

BACKGROUND OF THE INVENTION

This invention relates to voice distribution and switching and, in particular, to combining voice distribution and switching with video distribution on a broadband coaxial cable network.

In U.S. patent applications Ser. Nos. 635,751 and 805,388, assigned to the same assignee hereof, there is disclosed an improved system for providing voice and video distribution over a cable network. In the systems of these applications, a plurality of telephone user or subscriber locations are provided and each subscriber location has an associated RF transmitting channel and an associated RF receiving channel. These channels carry voice and signalling information to and from, respectively, the subscriber locations.

A broadband cable network communicates with the subscriber locations and carries or couples with the associated RF transmitting and receiving channels. The cable network also communicates with a centralized switching and control means which is adapted to enable the RF transmitting channels to be selectively coupled or switched to any of the RF receiving channels. As a result, voice communication between the associated subscriber locations of the coupled channels can be carried out.

The particular switching means disclosed in the '751 and '388 applications comprises a time division multiplex (TDM) switch and a frequency/time conversion means. The latter conversion means establishes transmitting and receiving TDM digital channels corresponding to the transmitting and receiving RF channels so as to permit switching between channels by the TDM switch. Also, in the systems of these applications, the RF transmitting and receiving channels are analog channels organized into broadband RF channels of the cable network. Each user location, in turn, is assigned and couples with the broadband RF channel or channels containing its associated transmitting and receiving channels.

In the systems of these applications, the RF broadband channels also include channels for coupling video signals to TV's at the subscriber locations as per standard cable TV (CATV) operation. This provides the dual capability of video and voice over the cable network.

In the standard CATV operation contemplated in the systems of the '751 and '388 applications, the video signals originate via the cable network provider. The video signals are, thus, limited to signals originating from cable company sources and transmitted downstream to the subscriber locations.

It is, therefore, an object of the present invention to provide an improved system for integrated distribution of voice and video on a cable network.

It is a further object of the present invention to provide a system for integrated distribution of voice and video on a cable network which provides additional flexibility for the transmission of video signals than that offered by the systems of the '751 and '388 applications.

SUMMARY OF THE INVENTION

In accordance with the principles of the present invention, the above and other objectives are realized in a system of the above-described type in which each subscriber location is adapted to include a video signal generating means and in which the system is further adapted to allocate one or more of its RF broadband video channels to the transmission of video signals generated at the subscriber locations. With these adaptations, each subscriber location can place video signals on an idle subscriber video channel for transmission to other subscriber locations on the same cable network or to subscriber locations on cable networks of other similar systems.

To permit transmission of video signals, the system of the invention is further provided with digital signal conversion and transmission means. This means is adapted to convert baseband video signals recovered from the subscriber video channels of the cable network and generated at a source subscriber location to digital signals organized into video frames. These frames are then either supplied back to the system or to another like system depending upon whether the destination subscriber location is on the same system or the other system. Transmission of the video frames to the other system is through a suitable switched multi-megabit data network.

The conversion and transmission means is further adapted to receive digital video frames carrying the subscriber video signals from subscriber locations on the other system and destined for a destination subscriber location on its system. Both in the case of the latter digital video frames of the other system and the digital video frames of its own system to be resupplied to its own system, the conversion and transmission means converts these video frames to baseband video signals for transmission on an idle subscriber video RF broadband channel for carrying them to the destination subscriber location.

Access to a subscriber video RF broadband channel is obtained by the source subscriber location providing an appropriate request over its RF voice channel to the central switch means controlling the interconnection of the voice channels. This switch means monitors the idle/busy status of the subscriber video RF broadband channels and advises the source subscriber location of an idle channel to which the subscriber can tune its video signal generating means. The subscriber location also uses the voice channel to provide the address of the destination subscriber location to which its video signal is to be transmitted. The central switch means passes this address information to the digital signal transmission and conversion means so that the resultant digital video signal frames contain the appropriate address of the destination subscriber location. This address can then be read from the digital signal frames by the conversion means of the system serving the destination subscriber location.

Incoming digital video frames to a conversion means are examined for the address of the destination subscriber location and this information is passed to the central switch means of the system receiving the incoming video. This switch checks the idle/busy status of the RF voice channel serving the destination address. It also checks the idle/busy status of the subscriber video broadband RF channels of the system. It then assigns an idle RF broadband channel to the video signal transmission and alerts the destination subscriber location over its RF voice channel of the incoming video and the assigned broadband channel. The destination subscriber location then tunes its TV receiver to the assigned channel for receipt of the video signal.

To permit only a destination subscriber location to receive a video signal destined for that subscriber location, standard CATV lockout procedures are used. Thus, the TV receivers at the subscriber locations are normally locked out or blocked from receiving video signals over the subscriber video RF broadband channels. Only when a video signal in a channel carries a destination address of the destination subscriber location is the TV receiver unlocked or unblocked so that receipt of the channel and video signal become possible.

BRIEF DESCRIPTION OF THE DRAWINGS

The above and other features and aspects of the present invention will become more apparent upon reading the following detailed description in conjunction with the accompanying drawings in which.

DETAILED DESCRIPTION

The description to follow ending on page 30 and FIGS. 1–10 describe and show a video/voice distribution system as described and shown in the '751 and '388 applications. The description from page 31 to page 39 and FIGS. 11–12 describe and show a modification of this system in accordance with the principles of the present invention.

Figure 1A:
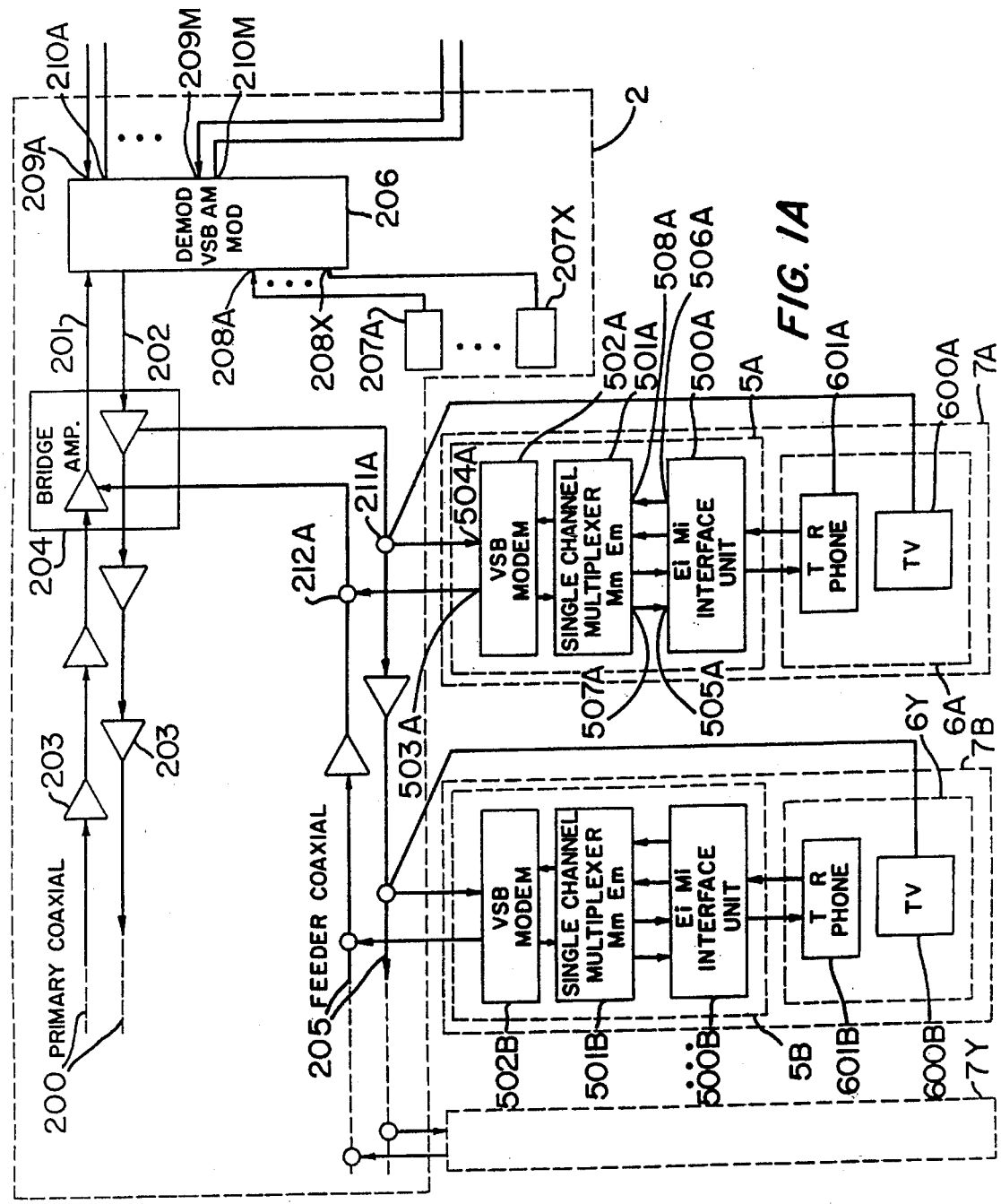
FIGS. 1A and 1B show a video/voice distribution system as disclosed in the '751 application.
Figure 1B:
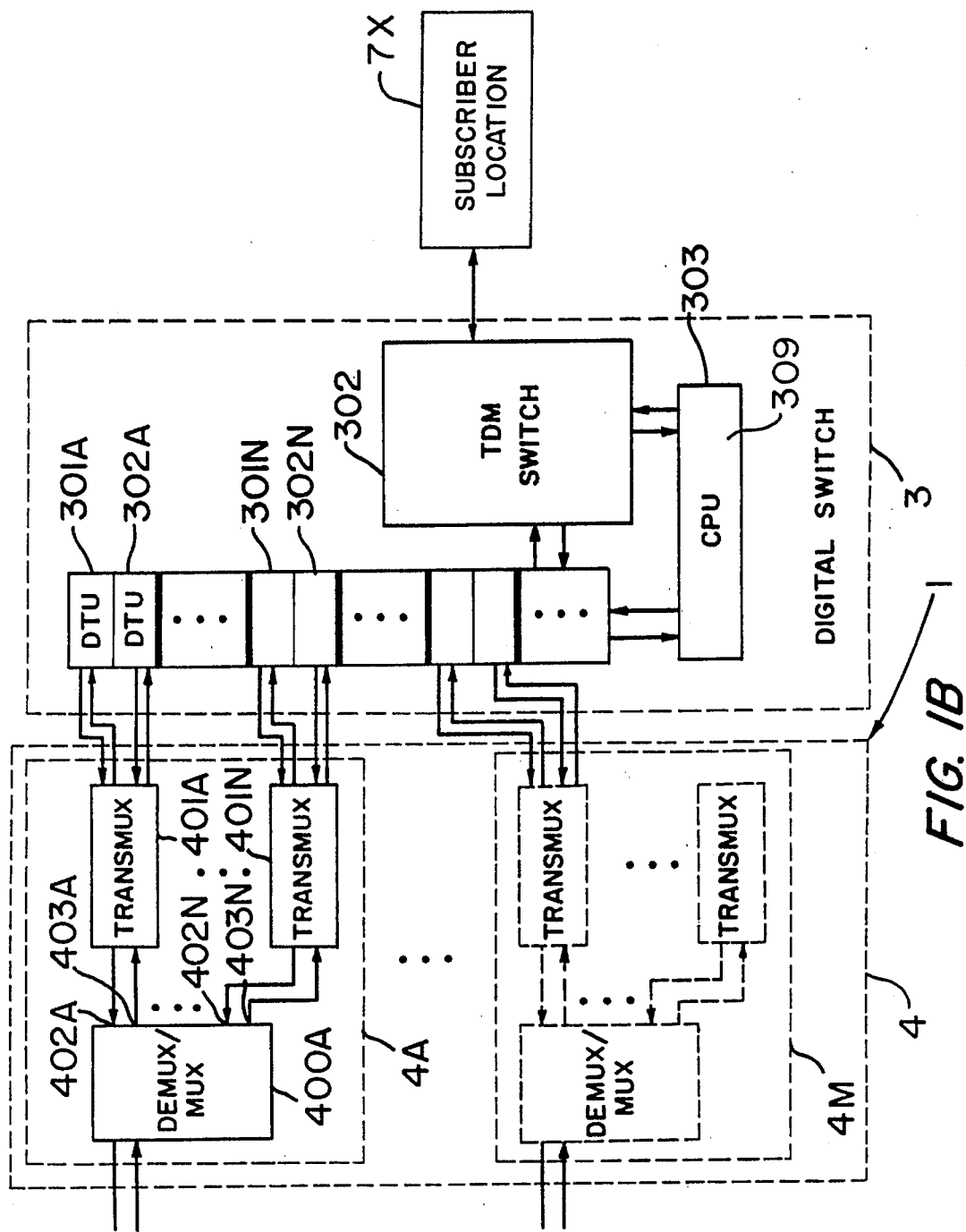

As shown in FIGS. 1A and 1B, the system 1 comprises a broadband coaxial network 2 which carries voice and video RF channels to voice and video equipment at the subscriber locations 7A to 7Y. More particularly, the broadband coaxial network 2 comprises a vestigial sideband ("VSB") demodulator/modulator 206 which transmits RF video channels and transmits and receives RF voice channels over a primary coaxial system 200 having feeder coaxial branches 205. The feeder coaxial branches 205 connect to the primary coaxial branch 200 through bridging amplifiers 204. They also connect to the tunable televisions or video receivers 600A–600Y at the subscriber locations 7A–7Y via drops 211A–211Y.

As shown, the coaxial branch 200 and each of its feeder branches 205 comprise an incoming or upstream coaxial cable 201 and an outgoing or downstream coaxial cable 202. Line amplifiers 203 are connected to the cables 201 and 202 at preselected intervals, e.g., intervals of approximately one half mile, to compensate for signal attenuation.

In the present case, the broadband coaxial network 2 is of the type typically used to distribute video signals and, thus, has a broad bandwidth reaching as high as about 900 Mhz. Furthermore, to permit concurrent distribution of multiple video signals on the network, the 900 Mhz bandwidth of the network is divided into multiple, contiguous broadband RF channels, each individual broadband RF channel being of sufficient bandwidth to carry an independent video signal. To accommodate standard video signals, each broadband RF channel would thus be approximately 6 MHz wide.

The VSB demodulator/modulator 206 receives input video signals 208A–208X from video or TV sources 207A–207X. Each video source 207A–207X might be an antenna or a satellite. The VSB demodulator/modulator 206 modulates the input video signals onto a network carrier so that the resultant network signal contains contiguous or multiplexed broadband RF channels each carrying one of the video signals. This network signal is placed on the downstream coaxial cable 202 and subsequently received and decoded by the tunable televisions or video receivers 600A–600Y located at the subscriber locations 7A–7Y.

The system 1 is further adapted to permit the distribution of voice information among the subscriber locations 7A–7Y, as well as the aforementioned video information. This is accomplished in a manner which allows for a relatively large number of selectively connectable voice channels and, therefore, a relatively large number of subscriber locations capable of voice communication with one another.

More particularly, a number of broadband RF (i.e., 6 MHz) channels of the cable network 2 are used to carry voice information and associated signalling and control information among the subscriber locations. This is accomplished by adapting the system 1 for each subscriber location to establish associated RF transmitting and RF receiving voice channels and by allocating these voice channels to one or more of the broadband RF channels being used for voice transmission. It is further accomplished by adapting the system 1 to provide central switching and control of the RF transmitting and receiving voice channels such that each RF transmitting voice channel can be selectively switched or coupled to any one of the RF receiving voice channels. In this way, a voice path can be established between each subscriber location and any of the other subscriber locations in the system.

In the present illustrative embodiment, the RF transmitting and receiving voice channels of each subscriber location are established by a respective drop box (i.e., 5A, 5B. . . , 5Y) located at the particular subscriber location. The RF voice channels associated with the different subscriber locations are, furthermore, established by the respective drop boxes so that they form RF voice channel groups, each voice channel group being allocated to a different one of the RF broadband channels assigned to voice transmission and being carried by the network 2 carrier.

In the present case, since the network 2 includes an upstream cable 201 as well as a downstream cable 202, the RF transmitting voice channel and RF receiving voice channel of each subscriber location can occupy the same RF band. Also, because the RF receiving and RF transmitting voice channels of a given subscriber location can occupy the same RF band, they can also be carried in the same RF broadband channel of the cable network.

In the event the cable network 2 were modified to use only a single cable for upstream and downstream transmission, the RF transmitting and RF receiving voice channels would have to be offset from each other to prevent interference. In such situation, the channels would likely be required to occupy separate RF broadband channels of the cable network.

As above-indicated, the RF transmitting voice channel groups established by the subscriber locations are carried in the upstream cable 201 in the multiplexed broadband RF channels of the network 2. Similarly, the RF receiving voice channel groups are carried via the downstream cable 202 again in the multiplexed RF broadband channels of the network.

As also above indicated, the system 1 is adapted to provide centralized, selective switching or coupling of the voice information and associated signalling information in each RF transmitting channel to any one of the RF receiving channels. In the present illustrative example, this is effected by a digital switch 3, which is shown as including a TDM switch 302 and a CPU 309, and by a time/frequency converter assembly 4. The converter assembly 4 includes individual time/frequency converter units 4A to 4M, each assigned to a particular RF broadband channel carrying a frequency division multiplexed (FDM) RF voice channel group.

More particularly, after demodulation of the upstream network signal to produce the individual RF broadband channels, the modulator/demodulator 206 passes the broadband channels to respective output ports 210A to 210M connected to converter units 4A-4M, respectively. Each converter unit then converts the RF transmitting voice channels in its received RF broadband channel into corresponding digital voice channels and one or more control channels organized into one or more TDM signals for processing by the digital switch 3.

As a result of its processing, the digital switch 3 places voice and signalling information into digital voice channels and one or more control channels which correspond to the receiving RF voice channels. The switch 3 organizes these digital voice channels and control channels also into one or more TDM signals and conveys these signals to their associated converters 4A to 4M, i.e., to the respective converters assigned to the RF broadband channel carrying the corresponding RF voice channels. Each converter then converts its received digital channels into a corresponding FDM RF receiving voice channel group. Each receiving voice channel group is then delivered to the modulator/demodulator 206 where it is placed in the corresponding broadband RF channel and modulated onto the network carrier for subsequent delivery to the subscriber locations via the downstream cable 202.

In the present illustrative case of the use of TDM switch 302 in the digital switch 3, the digital voice channels transmitted between the switch and each of the converters 4A to 4M are contained in time slots of the generated TDM signals. Each time division multiplexed signal contains a number of digital voice channels, a synchronization channel and a control channel for control and signalling information.

The TDM signals are communicated to and from the TDM switch 302 by digital trunk units (DTUs) included in the switch 3. A group of these units is associated with each converter unit 4A to 4M (e.g., DTU's 301A to 301N and 302A to 302N are associated with converter 4A). Each converter unit 4A to 4M, in turn, comprises a number of time/frequency converters (e.g., TRANSMUXES 401A to 401N) each of which transmits and receives the TDM signals from a pair of DTUs (e.g., DTUs 301A and 302A are paired with TRANSMUX 401A).

Each of the TRANSMUXES in the units 4A to 4M converts its received digital voice channels and its received synchronization and control channels into a corresponding FDM sub-group of RF receiving voice channels. Each FDM channel sub-group is then combined by a demultiplexer/multiplexer (DEMUX/MUX) unit in the respective converter (e.g., DEMUX/MUX 400A in converter 4A) with other channel sub-groups to generate an FDM RF channel group which is delivered to a respective receive port 209A to 209M on the modulator/demodulator 206.

In the other direction, the reverse process occurs in each of the converter units 4A to 4M. Thus, the FDM RF transmitting voice channel group received at each converter 4A to 4M is separated by the DEMUX/MUX into FDM sub-groups of RF transmit voice channels. These FDM sub-groups are then fed to respective TRANSMUXES, where they are converted to TDM time signals having corresponding digital transmit voice channels and associated synchronization and control channels. These TDM signals are delivered to corresponding DTUs and processing by the TDM switch 302.

Figure 2A:
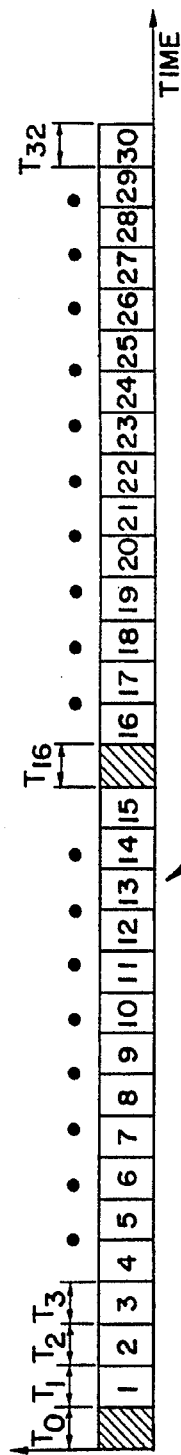
FIGS. 2A and 2B each show TDM voice channels used in the system of FIG. 1.
Figure 2B:
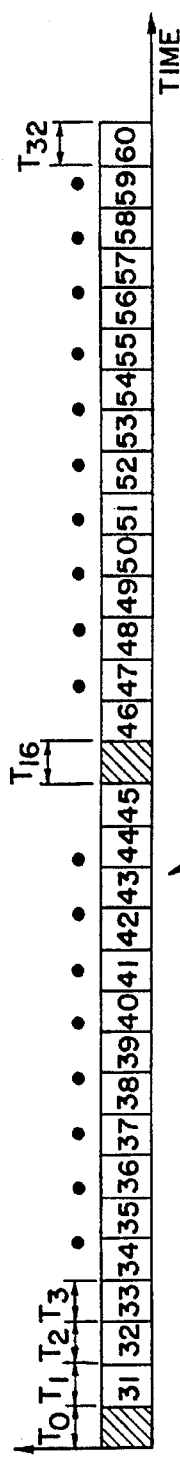

FIGS. 2A and 2B show the format of the TDM signals transmitted between the DTUs 301A and 302A and the TRANSMUX 401A of the converter unit 4A. Each signal is shown as carrying 30 digital voice channels (T1–T15 and T17–T32), one synchronization channel (TO) and one control channel (T16), the two signals together accounting for 60 voice channels.

Figure 3:
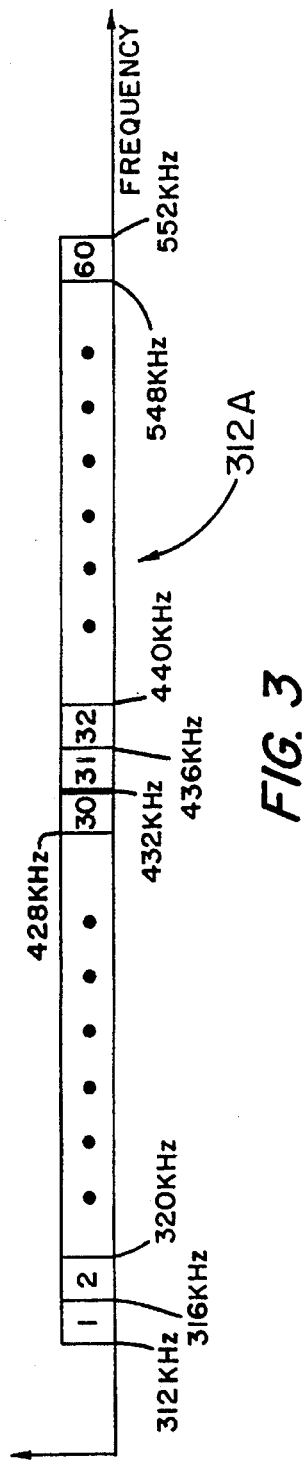
FIG. 3 shows the TDM voice channels of FIGS. 2A and 2B converted into a corresponding group of RF voice channels forming an RF voice channel sub-group.

FIG. 3 illustrates the FDM RF receiving voice channel sub-group signal transmitted between the TRANSMUX 401A and DEMUX/MUX 400A of the unit 4A. This signal results from frequency conversion of the TDM signals of FIGS. 2A and 2B. As shown, each digital voice channel is converted into a 4 KHz wide RF voice channel, resulting in 60 RF voice channels, each containing the voice, control and synchronization information pertaining to its associated digital channels.

Figure 4:
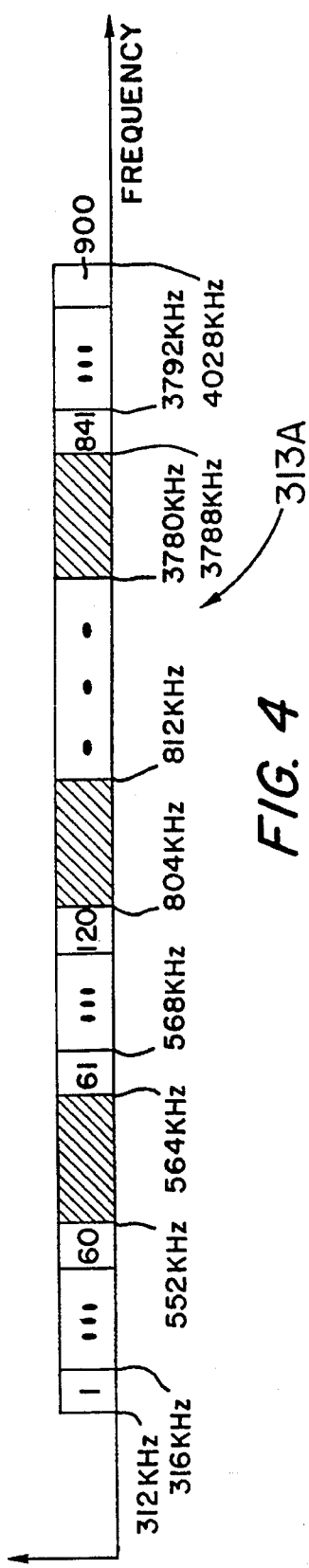
FIG. 4 shows additional RF voice channel sub-groups multiplexed with the voice channel sub-group of FIG. 3 to form a broadband RF voice channel group.

FIG. 4 illustrates the resultant FDM RF receiving voice channel group signal delivered by the DEMUX/MUX 400 as a result of the applied FDM RF sub-groups from the TRANSMUXES 401A to 401N. The illustration assumes 15 TRANSMUXES in the converter 4A, resulting in (15×60) or 900 RF receive voice channels over a frequency band of 312 KHz to 4028 KHz.

Figure 5:
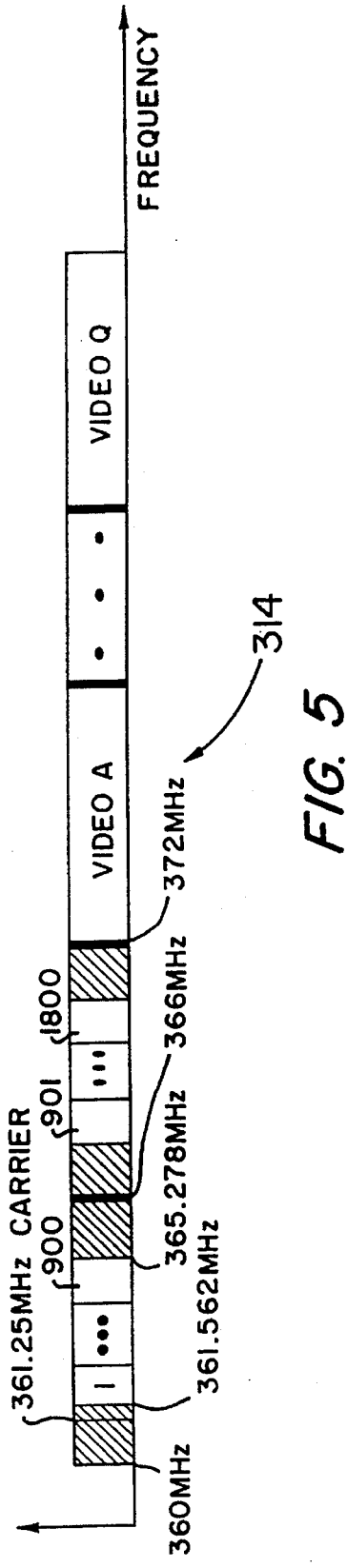
FIG. 5 shows the broadband RF voice channel group of FIG. 4 modulated onto an RF cable network carrier with other contiguous broadband RF voice channel groups and broadband RF video channels.

Finally, FIG. 5 shows the downstream network signal from the modulator/demodulator 206. As shown, the FDM RF receiving voice channel group of FIG. 4 has been modulated onto the network carrier (361.25 Mhz) in a first 6MHz RF broadband channel. Also shown is another FDM RF receiving voice channel group containing RF voice channels 901 to 1800 modulated onto the network carrier in a second 6 MHz channel contiguous with the first channel. As mentioned earlier, the downstream signal also contains video channels, (VIDEO A and VIDEO B), also modulated onto the carrier in further multiplexed 6 MHz broadband channels.

As above-indicated, the RF transmitting and receiving voice channels are coupled to and from their corresponding subscriber locations via respective dropboxes 5A to 5Y. Referring to dropbox 5A for illustrative purposes, the dropbox comprises a VSB modulator/demodulator or modem 502A, a single channel multiplexer 501A, and an interface unit 500A. The VSB modem 502A has a receiving port 504A which connects to the downstream cable 202 at drop 211A and a transmitting port 503A which connects to the upstream cable 201 at drop 212A.

The VSB modem 502A is configured to demodulate or extract from the downstream network signal the broadband RF channel (i.e., 6MHz channel) containing the RF receiving voice channel associated with the subscriber location 7A. Thus, assuming the subscriber location 7A corresponds to the RF receiving voice channel 1 in the network signal of FIG. 5A, the modem 502A will extract from this signal the first broadband RF channel (i.e, the 360–366 MHz channel), since it contains the RF receiving voice channel 1. Conversely, an RF transmitting voice channel 1 sent by the single channel multiplexer 501A to the VSB modem 502A will be modulated by the VSB modem 502A into the first broadband RF channel and then transmitted from port 503A of the modem to the upstream cable 201.

The first broadband RF voice channel (366–366 MHz) once extracted by the modem 502A, is then conveyed to the single channel multiplexer 501A which is configured to demodulate the RF channel group to obtain the associated RF receiving voice channel (channel 1) and return this channel to base band to recover the resultant 4 KHz baseband receiving channel. This channel is then processed to extract voice information (i.e., band limited to 300–3400 Hz) and also processed to extract any out-of-band signalling information. The voice information is then passed via output port 507A to an input port 505A of an interface unit 500A. The signalling information is, in turn, passed via another output port Mm to a further input port Ei of the interface unit.

In the transmit direction, the single channel multiplexer 501A receives at its input port 508A from the output port 506A of the interface unit 500A, baseband voice information. The multiplexer also receives signalling information at its Em port from the Mi port of the interface unit. This voice and signalling information is, in turn, modulated by the multiplexer into the RF transmitting voice channel (i.e., channel 1) and sent by the multiplexer to the modem 502A where it is placed in the first RF broadband channel of the network 2, as above-described.

The interface unit 500A provides a standard tip T and ring R connection to a phone 601A located at subscriber location 7A. The band-limited receiving voice channel information at the input terminal 505A of the interface unit 500A is provided to these connections so that voice information becomes available at the phone 601A. Further, transmitted voice information received from the phone 601A on the tip T and ring R connections is transferred by the output terminal 506A of the interface unit 500A to the single channel multiplexer for inclusion in the transmitting voice channel being transmitted at the subscriber location.

The interface unit 500A also develops signalling information based upon the signalling information received at its Ei port and the state of the phone 601A. This signalling information is passed from the Mi port of the interface to the Em port of the modem where it is included in the RF transmitting voice channel developed by the modem, as above-described.

It is desirable to avoid frequency shifts in the modulating and demodulating process performed at the drop boxes 5A to 5Y. To achieve synchronization, the system 1 is further adapted to provide a synchronizing pilot signal at the drop boxes. This signal is supplied from the reference source used to generate the RF channel group signals at the DEMUX/MUX 400A.

Figure 6:
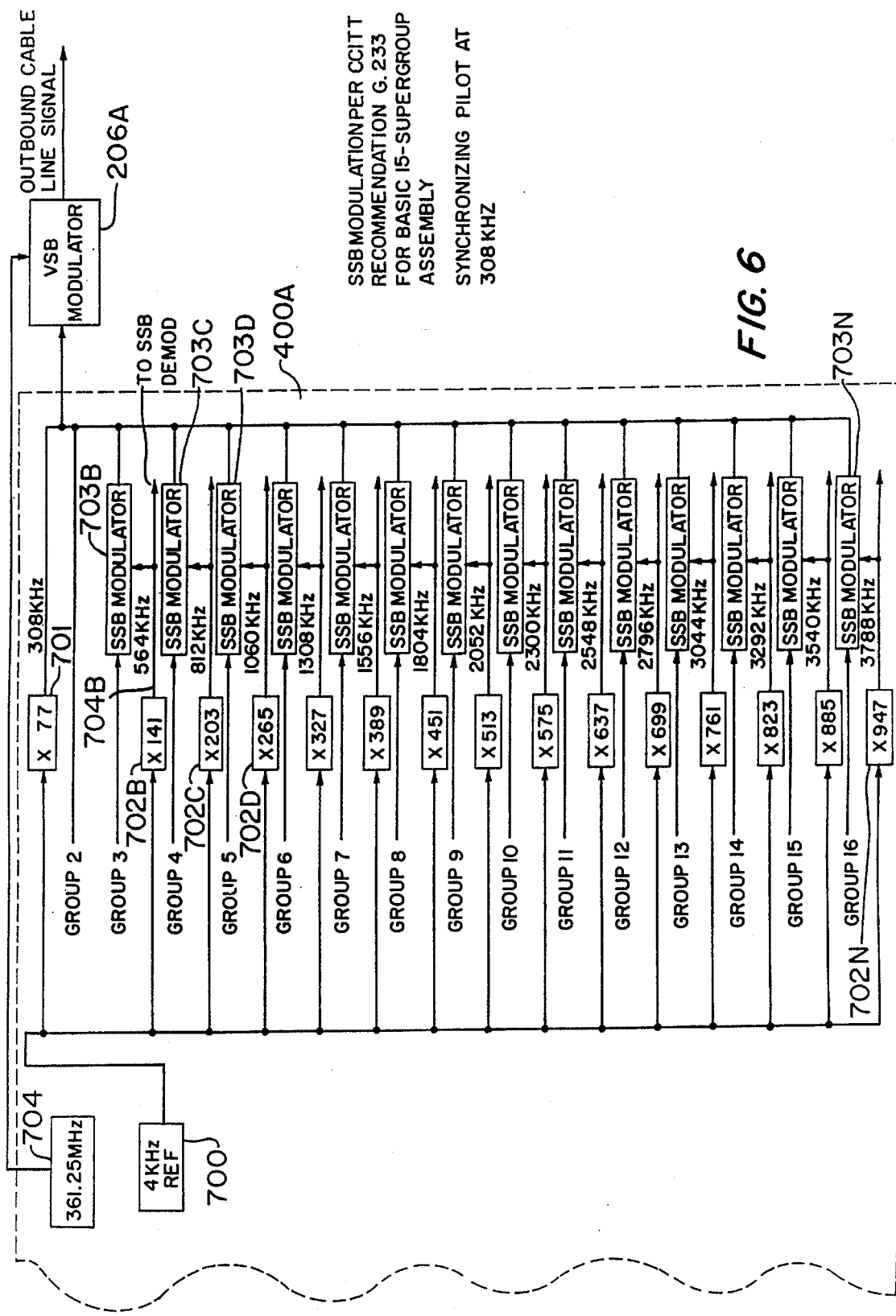
FIG. 6 shows schematically equipment for realizing the broadband RF voice channel group of FIG. 4.

FIG. 6 shows in greater detail the multiplexing section of the DEMUX/MUX 400A used to generate the RF channel group of FIG. 5. A 4 Khz reference frequency source 700 serves as the primary source for generating both pilot signal and reference frequencies for multiplexing the RF channel sub-groups (i.e., groups 2–16). More particularly, the reference frequency is applied to a pilot frequency multiplier 701 which multiplies the frequency by 77 to develop a 308 KHz pilot signal. This signal is modulated onto the network carrier provided by a carrier source 704 to the VSB modulator/demodulator 206. The pilot signal is then recovered at the drop boxes and used to develop reference frequencies for demodulation and modulation as described below.

As is also shown in FIG. 6, the 4 Khz reference frequency is also applied to suitable multipliers 702B–702N whose outputs are applied as reference frequencies to the single sideband modulators 703B–703N. The latter, in turn, modulate the RF frequency sub-groups to develop the RF channel group in FIG. 4. This channel group is also applied to modulator/demodulator 206 to generate the first broadband RF channel of the signal in FIG. 5.

Figure 7:
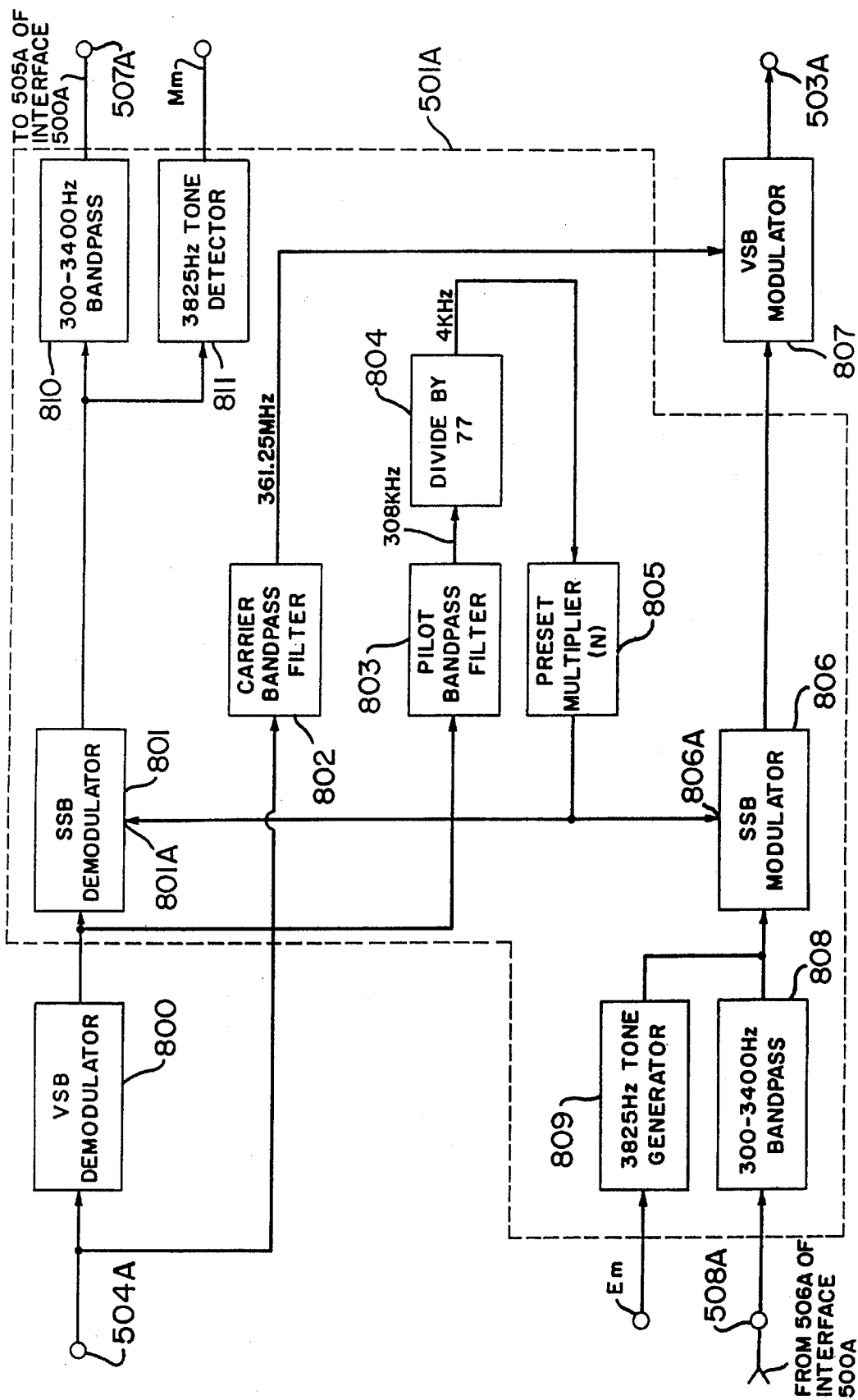
FIG. 7 shows the details of the modulation/demodulation apparatus used at the subscriber locations of the system of FIG. 1.

FIG. 7 shows in greater detail the VSB modem 502A and the single channel multiplexer 501A shown in FIG. 1 modified to utilize the pilot signal generated at the DEMUX/MUX for synchronization. The network signal received at the VSB modem input port 504A is supplied to a carrier bandpass filter 802 and, after passage to VSB demodulator 800, to a pilot bandpass filter 803. The network carrier bandpass filter 802 recovers the 361.25 Mhz network carrier, while the pilot bandpass filter 803 recovers the 308 Khz pilot signal. The recovered signals are then used in the modulator and demodulator processing to ensure synchronization.

More particularly, the recovered network carrier is applied to the VSB modulator 807 of the VSB MODEM 502, thereby ensuring that modulation occurs at the appropriate frequency. The 308 KHz pilot signal, in turn, is applied to a divide by 77 frequency divider 804 to recover the 4 Khz reference signal. This signal is then applied to a preset multiplier 805 to derive the reference frequency for the associated RF transmit and receive voice channels of the subscriber location (i.e., the frequency 312 Khz for the channel 1 of the location 7A). This reference frequency is then applied to the SSB Modulator 806 and the SSB Demodulator 801A of the multiplexer to provide the RF transmit voice channel and recover the baseband voice channel, respectively.

The multiplexer 501A of FIG. 7 also contains bandpass filters 808 and 810 which are used to band-limit the recovered baseband voice channel and the voice channel being transmitted, respectively. Also, the multiplexer is provided with an out-of-band tone generator 809 and an out-of-band tone detector 811. These components generate and detect a 3825 Hz tone which is used as signalling information in the RF transmit and receive voice channels of the subscriber locations.

More particularly, 3825 Hz signalling tones are used to provide an indication of on and off hook conditions and to generate ringing signals. In the present case, each interface unit provides simple logic changes to indicate the on and off hook conditions of its respective phone. These conditions are used to instruct tone generation by the respective multiplexer. Also, the switch 3 uses 3825 Hz tones to request connection to a subscriber location. These interactions will become apparent in the description of the operation of the system 1 set forth hereinbelow.

In the system of FIG. 1, the modems 502A–502Y used at the drop boxes 5A–5Y develop the RF transmitting channels as vestigial sideband signals. The resultant upstream signal on the line 201 thus comprises a number of vestigial sideband signals each carrying a part of the network carrier. These signals are received at the VSB modulator/demodulator 206 which, in accordance with conventional vestigial sideband principles, demodulates the signals by regenerating the network carrier from the received signals and using the regenerated carrier to demodulate the signals. This extracts the RF broadband channels containing the RF transmitting voice channel groups. Each broadband channel is then applied to the appropriate DEMUX/MUX.

Because the vestigial sideband signals in the upstream signal originate at different subscriber locations they will likely arrive at the modulator/demodulator 206 with different phases which may vary over time. As a result, the phase of the network carrier recovered by the VSB modulator/demodulator 206 from these signals may also vary with time.

If this varying phase of the recovered network carrier is found to be undesirable, the modulator/demodulator 206 can be suitably modified to utilize a network carrier for demodulation whose phase does not vary.

Figure 7A:
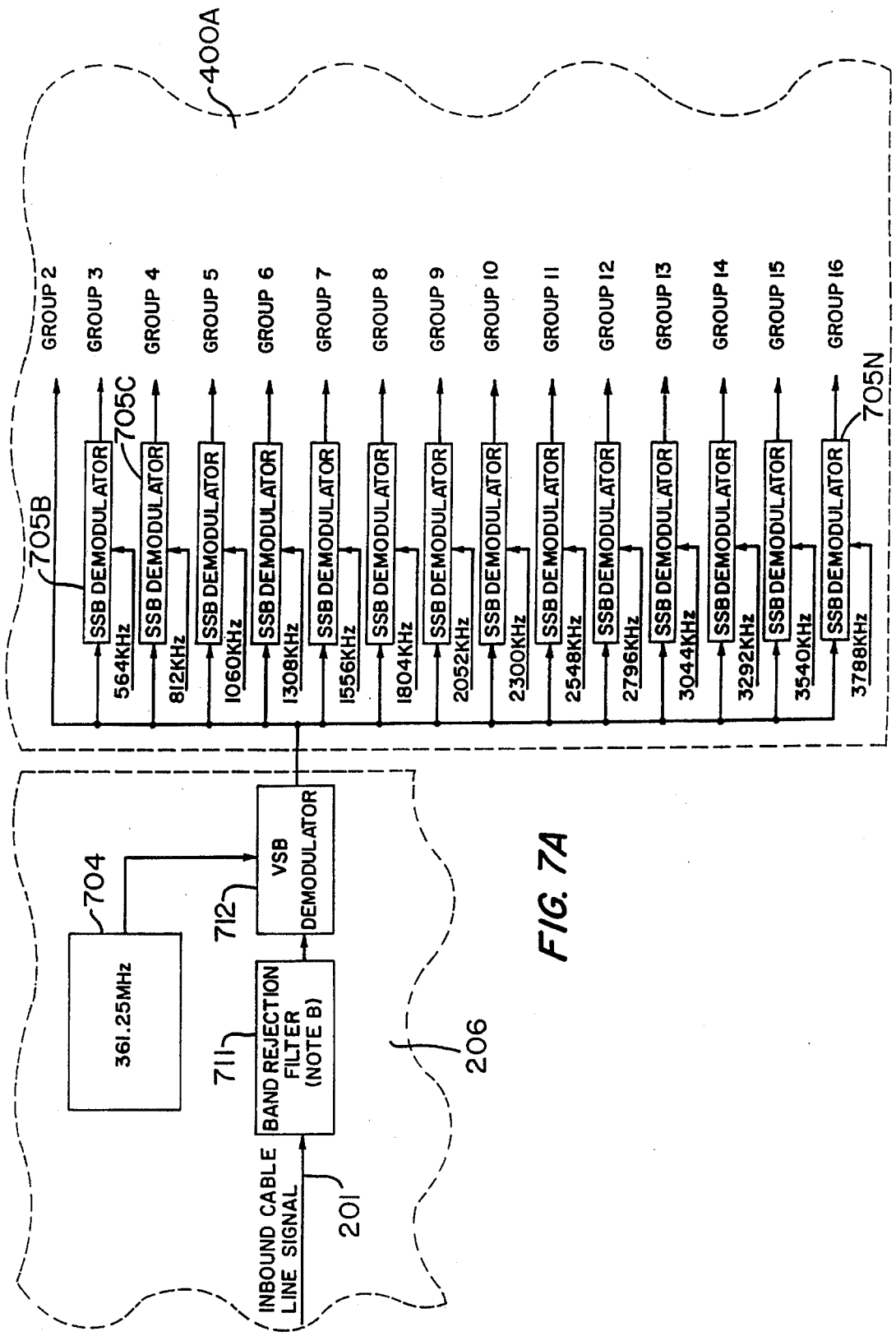
FIG. 7A shows the demodulation portion of the VSB modulator/demodulator of the cable network modified to ensure use of a network carrier having a stable phase.

FIG. 7A shows the demodulation portion of the modulator/demodulator 206 modified to realize this. As can be seen, the upstream signal into the demodulator is first passed through a band rejection filter 711 which is adapted to reject signals at the network carrier frequency (i.e., 361.25 MHz in the present example). The filtered signal is then passed into a VSB demodulator 712 which is now supplied with the network carrier from the carrier source 704 used to supply the VSB modulator 206A (see, FIG. 6). The demodulated signal is then applied to the demultiplexer section of the appropriate DEMUX/MUX to recover the RF channel subgroups.

In FIG. 7A, the portion of the DEMUX/MUX 400A for recovering the channel sub-groups 2–16 shown in FIG. 6 is also illustrated. As shown, SSB demodulators 705B–705N supplied with appropriate demodulation frequencies recover the respective channel groups 2-16.

Figure 8:
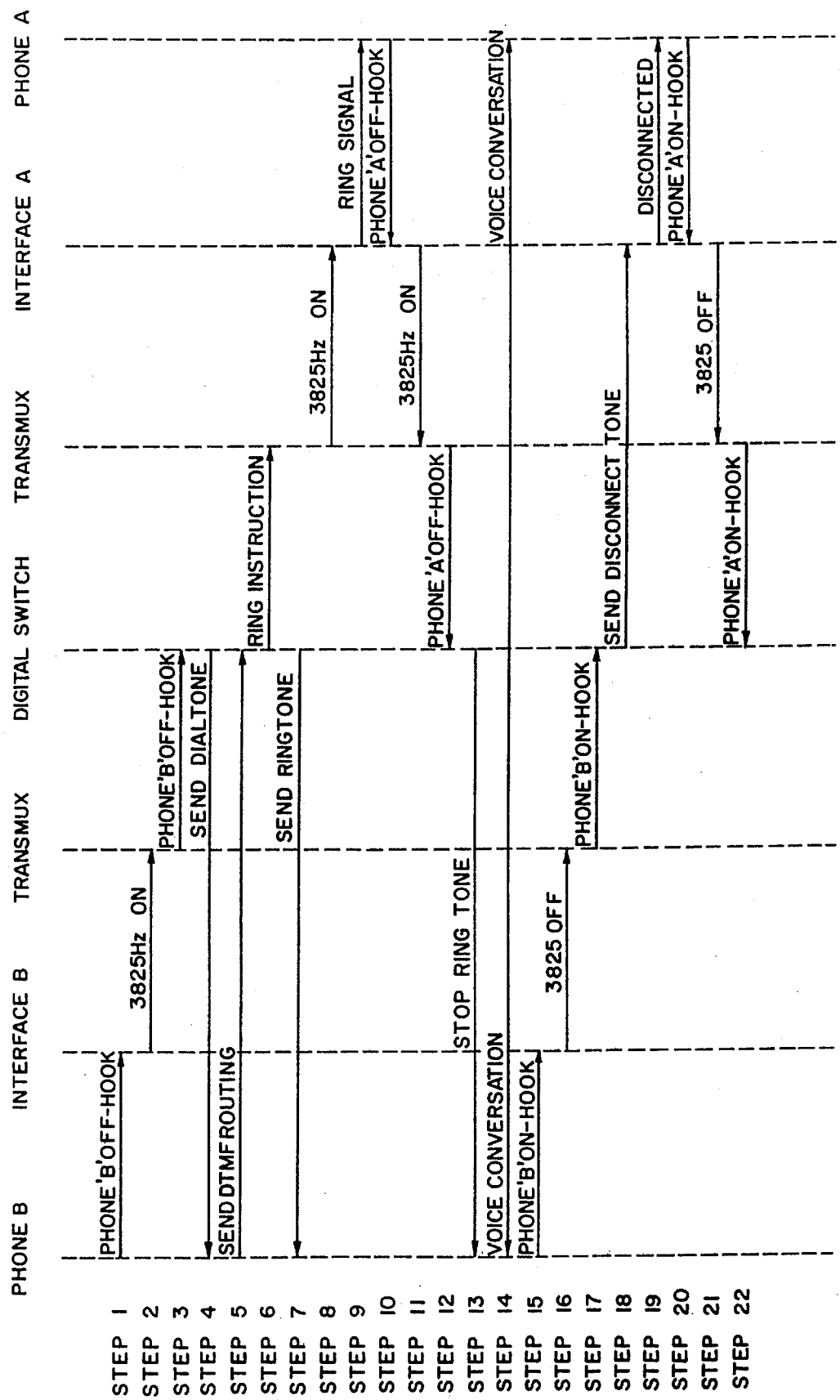
FIG. 8 shows a timing chart for operation of the system of FIG. 1.

FIG. 8 shows the sequence of events when placing a call from the phone 601B at the location 7B to the phone 601A at the location 7A. In the description, it will be assumed that the location 7A uses transmitting and receiving RF voice channel 1 and that the location 7B uses the transmitting and receiving RF voice channel 2, shown in FIGS. 3–5.

Step 1: —PHONE 601B OFF-HOOK—; When phone 601B goes off-hook, the interface 500B detects a change in the state of the associated tip T and ring R lines.

Step 2: —3825 Hz ON—; The interface 500B transfers a logic signal from its Mi port to the Em port of the single channel multiplexer 501B instructing it to turn on the 3825 Hz tone generator. This causes a 3825 Hz tone to be continuously transmitted in the associated RF transmitting voice channel 2 of the network signal of the modem 502B.

Step 3: —PHONE 601B OFF-HOOK—; The RF transmitting voice channel 2 containing the 3825 Hz tone is passed by the modulator/demodulator 206 and DEMUX/MUX 400A to the TRANSMUX 401A assigned to transmitting channel 2. The TRANSMUX detects the presence of the 3825 Hz tone and transmits an off hook signal to the TDM switch 302 via DTU 301A. This signal is carried in the control channel of the TDM signal carrying the transmit voice channel 2 and indicates to the switch that the channel 2 is off-hook.

Step 4: —SEND DIALTONE to PHONE 601B—; The TDM switch 302 places a dial tone signal in the control channel of the TDM signal carrying the receiving voice channel 2 and it is delivered by the DTU 301A to the TRANSMUX 401A. The latter places a dial tone in the RF receiving voice channel 2 which passes via the downstream network signal to the corresponding drop box 5B. This tone is extracted by bandpass filter 810 in the multiplexer 501B and passed through the interface circuit 500B to the T and R lines of phone 601B.

In the remaining discussion of the operating steps of the system 1, it will be understood that transmission between the drop boxes 5A and 5B and the TDM switch 3 occurs over the associated drop box components, the associated cables, the modulator/demodulator 206, and the associated DEMUX/MUX, TRANSMUX and DTU, although these components may not be specifically mentioned in the interests of brevity.

Step 5: —SEND DTMF PHONE NUMBER—; Upon receiving dial tone, the DTMF phone number of phone 601A is transmitted from phone 601B to the TDM switch 302 over the RF and corresponding digital voice channel 2. The digital switch looks up in memory the DTMF phone number dialed and determines that the phone being called is on voice channel 1, i.e., is the phone 601A.

Step 6: —RING INSTRUCTION—; The TDM switch 302 sends a message in the control channel of the TDM signal containing the voice channel 1 instructing the TRANSMUX 401A to turn on a 3825 Hz tone in RF receive voice channel 1.

Step 7: —SEND RING TONE TO ORIGINATOR—; The TDM switch 302 then sends a ringing tone to phone 601B via voice channel 2.

Step 8: —3825 Hz ON—. The TRANSMUX 401A turns on the 3825 Hz signal for the receiving voice channel 1.

Step 9: —RING SIGNAL—. The single channel multiplexer 501A associated with receiving voice channel 1 and phone 601 detects the presence of the 3825 Hz signal and passes a logic signal from its Mm port to the Ei port of interface 500A. The interface 500A then generates a ring signal on the tip T and ring R lines of phone 501A.

Step 10: —PHONE A OFF-HOOK—; When phone 501A is answered there is a detectable change in the state of the associated tip T and ring R lines.

Step 11: —3825 Hz ON—; The interface 500A detects the change in state via a signal to its Em port from the Mi port of the interface. It then instructs the single channel multiplexer 501A to turn on its tone generator to initiate a continuous 3825 Hz tone in transmitting RF voice channel 1 and ceases generating the ringing signal on the tip R and ring R lines of phone 601A.

Step 12 —PHONE A OFF-HOOK—; The TRANSMUX associated with transmitting RF voice channel 1 detects the presence of the 3825 Hz tone in the RF voice channel 1 and transmits an off-hook signal to the TDM switch 302 via the control channel of the TDM signal containing the transmitting voice channel 1.

Step 13 —STOP RING TONE—; The TDM switch stops the ringing tone being sent over the RF receiving voice channel 2.

Step 14: —VOICE CONVERSATION—; The TDM switch at this time has now established a virtual talk path between the calling phone 601B and the called phone 601A over the RF transmit and receive voice channels 2 and the RF transmit and receive voice channels 1. Bidirectional conversation can now occur.

Step 15: —PHONE 601B ON-HOOK—; When phone 601B goes on-hook (i.e., hangs up), the interface 500B detects a change in the state of the associated tip T and ring R line.

Step 16: —3825 Hz OFF—; The interface 500B via its Mi port instructs the single channel multiplexer 501B via its Em port to turn off the 3825 Hz tone generator.

Step 17: —PHONE 601B ON-HOOK—; The TRANS-MUX 901A assigned to RF voice channel 2 detects the absence of the 3825 Hz tone and transmits an on hook signal to the TDM switch 302 in the control channel of the TDM signal containing the transmit voice channel 2.

Step 18: —SEND DISCONNECT TONE—; The TDM switch 302 then terminates the virtual path established between voice channel 2 and the voice channel 1, i.e., phones 601B and 601A. The TDM switch then transmits a message over the TDM signal containing the receiving voice channel 1 to the TRANSMUX instructing the TRANSMUX to turn off the 3825 tone in the voice channel 1.

Step 19: —DISCONNECTED—; The interface 500A detects the absence of a 3825 Hz tone in receiving voice channel 1 and sends dial tone to phone 601A.

Step 20: —PHONE ON-HOOK— When phone 601A is placed on-hook there is a detectable change on its associated tip T and ring R lines.

Step 21: 3825 Hz OFF—; The interface 500A detects the change in state and instructs via its Mi port the single channel multiplexer 501A at its Em port to cease transmitting the 3825 Hz tone in RF voice channel 1.

Step 22 —PHONE 601A ON-HOOK—; The TRANS-MUX associated with RF voice channel 1 detects the absence of the 3825 Hz tone in voice channel 1 and transmits an on-hook signal to the TDM switch 302.

The above described process is repeated for subsequent phone conversations.

Figure 9:
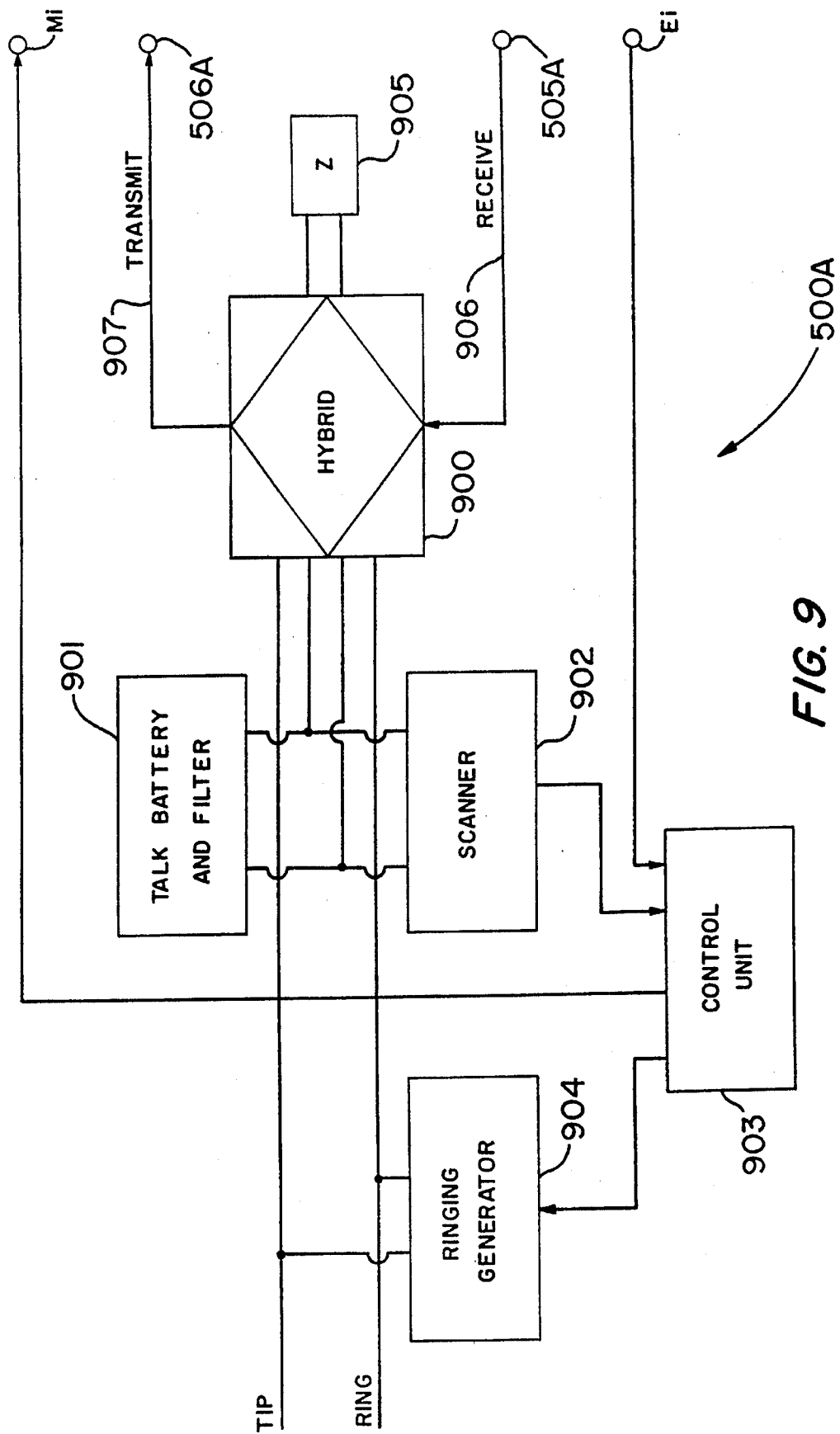
FIG. 9 shows the details of the interface unit used at the subscriber locations of the system of FIG. 1.

FIG. 9 shows in greater detail an example of the interface unit 500A. Similar units can be used for the other interface units 500B–500Y. As shown, a hybrid circuit 900, having a balancing impedance Z, depicted at 905, connects to the TIP and RING lines. A receive line 906 and a transmit line 907 from the input terminal 505A and the output terminal 506A, respectively, connect to the hybrid circuit 900. A scanner 902 is also connected to the hybrid 900 and detects whether the tip T and ring R lines indicate an on-hook or off-hook condition. A ringing generator 904 connects to the TIP and RING lines and generates a ringing signal when directed to do so by control unit 903. A control unit 903 receives signals from the scanner 902 and the Ei input terminal. Further the control unit supplies control signals to the ringing generator 904 and the Mi output terminal. The various states of ports Ei, Mi, the scanner 902 and the ring generator 904 as controlled by the control unit 903 are given below. These states follow from the above discussion of the operation of the system 1. States 1–3 relate to a calling phone and states 4–6 relate to a called phone. An off-hook status indicates an active state and an on-hook status an inactive state.

| State 1: When a phone is idle | |
|---|---|
| Scanner | = on hook |
| Ei | = on hook |
| Mi | = on hook |
| Ring Gen. | = no ring |
| Switch 302 | = not connected |
| State 2: Initiating a call | |
| Scanner | = off hook |
| Ei | = on hook |
| Mi | = off hook |
| Ring Gen. | = no ring |
| Switch 302 | = dial tone, busy tone, ringing tone |
| State 3: Connection with destination | |
| Scanner | = off hook |
| Ei | = off hook |
| Mi | = off hook |
| Ring Gen. | = no ring |
| Switch 302 | = connected |
| State 4: incoming call | |
| Scanner | = on hook |
| Ei | = off hook |
| Mi | = on hook |
| Ring Gen. | = ring |
| Switch 302 | = not connected |
| State 5: phone answered | |
| Scanner | = off hook |
| Ei | = off hook |
| Mi | = off hook |
| Ring Gen. | = no ring |
| Switch 302 | = connected |
| State 6: Calling phone disconnects | |
| Scanner | = off hook |
| Ei | = on hook |
| Mi | = off hook |
| Ring Gen. | = no ring |
| Switch 302 | = not connected |

Figure 10:
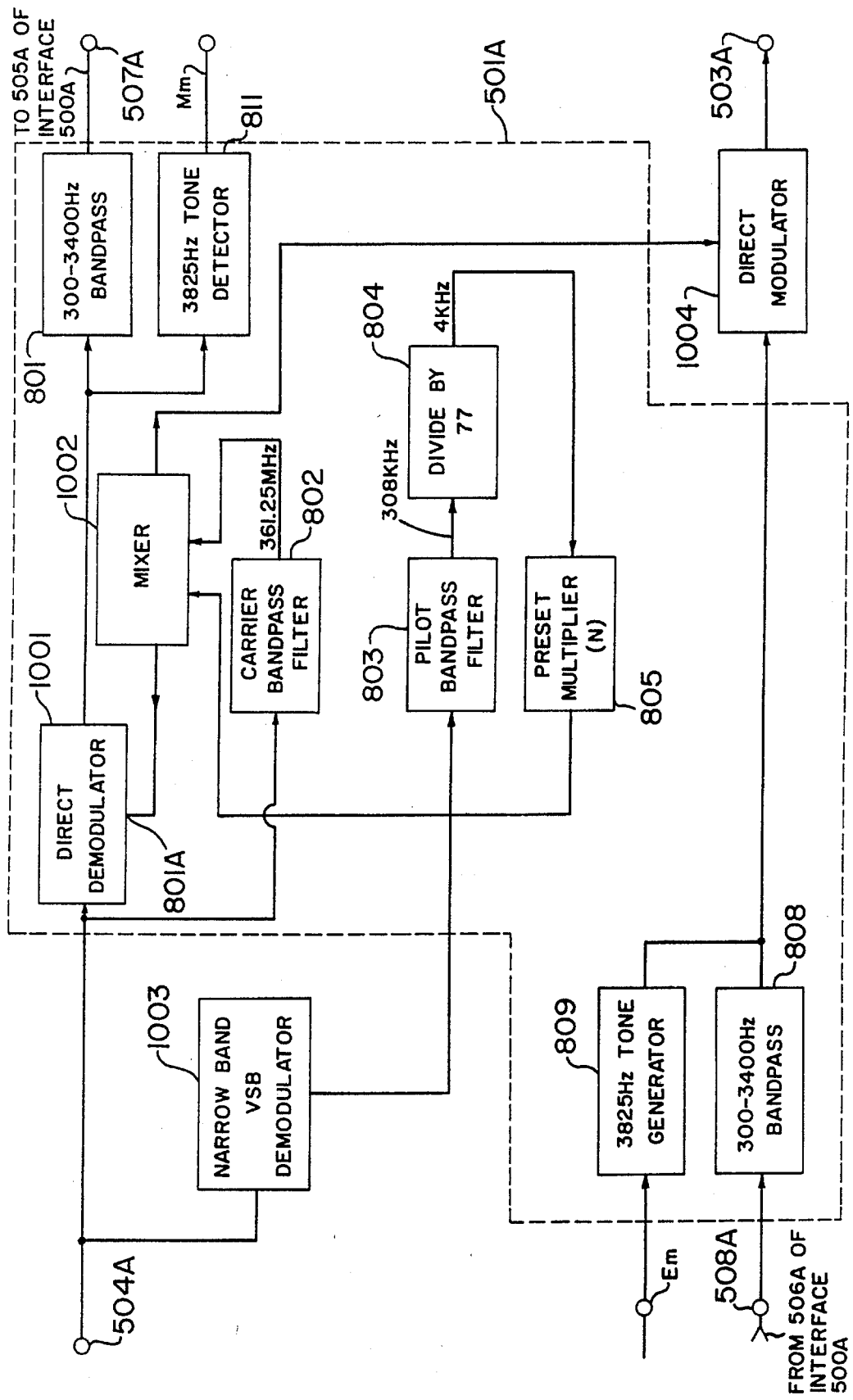
FIG. 10 illustrates a modification of the modulation/demodulation apparatus of FIG. 7.

FIG. 10 illustrates a modification of the VSB modem and single channel multiplexer shown in FIG. 7. In the case of FIG. 10, the RF transmitting and receiving channels are developed by direct modulation and demodulation, respectively. This is realized, in the case of the RF transmitting channel, by modulating the voice and signalling information directly at the frequency desired for the transmitting channel in the associated RF broadband channel. In the case of the RF receiving channel, it is realized by demodulating the received signal directly at the frequency of the RF receiving channel in its associated RF broadband channel. Furthermore, the pilot signal is recovered from the received signal in the FIG. 10 arrangement by using a VSB demodulator whose frequency band of operation need only be sufficiently wide to reach the pilot frequency as modulated onto the network carrier.

In FIG. 10, those components which are the same as those in FIG. 7 have been numbered the same. As shown, the downstream signal received at port 504A is applied to direct demodulator 1001 which directly recovers the RF receiving channel by demodulation at the specific carrier frequency of the channel in the downstream signal. For example, in the case of the RF receiving channel 1 in FIG. 5, the demodulation frequency applied to demodulator 1001 to recover the channel would be at 361.562 MHz. The latter frequency is generated by a mixer 1002 which multiplies the recovered network carrier signal (361.25 MHz) by the output signal (for channel 1 this output is at 312 KHz) of the present multiplier 805.

As in FIG. 7, the preset multiplier 805 develops its output signal by multiplying the 4KHz reference signal by the factor N. The 4 KHz reference is obtained at the output of the divide by 77 circuit 804 which divides the 308 KHz synchronization pilot signal developed at the output of pilot bandpass filter 803.

The 308 KHz synchronization signal is generated, in this case, from the downstream signal by first passing it through a narrow bandpass VSB demodulator 1003. The pass band of this demodulator need only be sufficient to extend to the 308 KHz synchronization signal as modulated on the network carrier (i.e., extend to 361.588 MHz). The output of the demodulator is then fed to bandpass filter 803 to recover the actual 308 KHz signal.

The output of mixer 1002 is also applied to direct modulator 1004. This results in the input voice and signalling signals to the modulator being directly modulated at frequency (in the case of channel 1 at 361.562 MHz) which places the RF transmitting channel at the desired frequency position in the upstream signal.

It should noted that the TDM switch 302, the TDUs, TRANSMUXES and the DEMUX/MUX of the digital switch 3 and converter 4 can be provided by suitably modified conventionally available components operating on a usual CCITT standard used for TDM transmission. A particular example of a TDM switch 3 might be a Harris #20-20 digital switch equipped with a Harris # 2MB DTU operating at CCITT recommendation G.700. An example of a suitable TRANSMUX might be the DSC-Granger TM 7800-M1 TRANSMUX. A suitable DEMUX/MUX would be one operating in accordance with CCITT recommendation G.233.

As can be appreciated, with the system 1, it is now possible to provide voice communication, via the cable network 2 and the centralized switch 3, between a large number of subscriber locations. For the present illustrative case, 900 voice channels corresponding to 900 subscriber locations have been provided in each 6 MHz RF broadband channel of the cable network, as compared to only 28 channels and locations for the prior art systems. Moreover, the 900 channels in each 6 MHz broadband channel can be connected to each other and any of the channels in the other 6 MHz channels. Accordingly, by suitable selection of the number of broadband channels of the network 2 allocated to voice transmission, 10,000 or more selectively interconnectable voice channels can be provided.

It should be noted that the TDM switch 302 can itself be a switch in a conventional telephone system which is adapted to couple with the cable network as above-described. In such case, subscriber locations (e.g., location 7X) connected to the switch, but not served by the cable network, can also be connected through the switch and the cable network to the subscriber locations served by the network. Additionally, subscriber locations connected through other switches and trunks to the TDM switch can be similarly connected to the subscriber locations on the cable network.

It should also be noted that the system 1 can be further modified so that dial tone need not be established at a subscriber location by the respective interface 500A detecting the absence of the 3825 Hz tone (step 19 of FIG. 8). Instead, when the TDM switch 302 terminates a virtual voice path between subscriber locations (step 18 in FIG. 8), it can itself directly send dial tone to the subscriber location which is still offhook, allowing the off-hook subscriber to establish another call or go on-hook, as desired.

As can be appreciated from the above, the system 1 of the FIGS. 1–10 permits voice communication as well as video signal communication over the cable network 2 to the subscriber locations 7A–7Y. However, as can also be appreciated, the video signal communication is downstream communication only, i.e., communication to the subscriber locations 7A–7Y over the RF broadband video channels A–Q. This limits the video signals receivable at the video receivers at the subscriber locations to those originating from the cable network provider.

Figure 11:
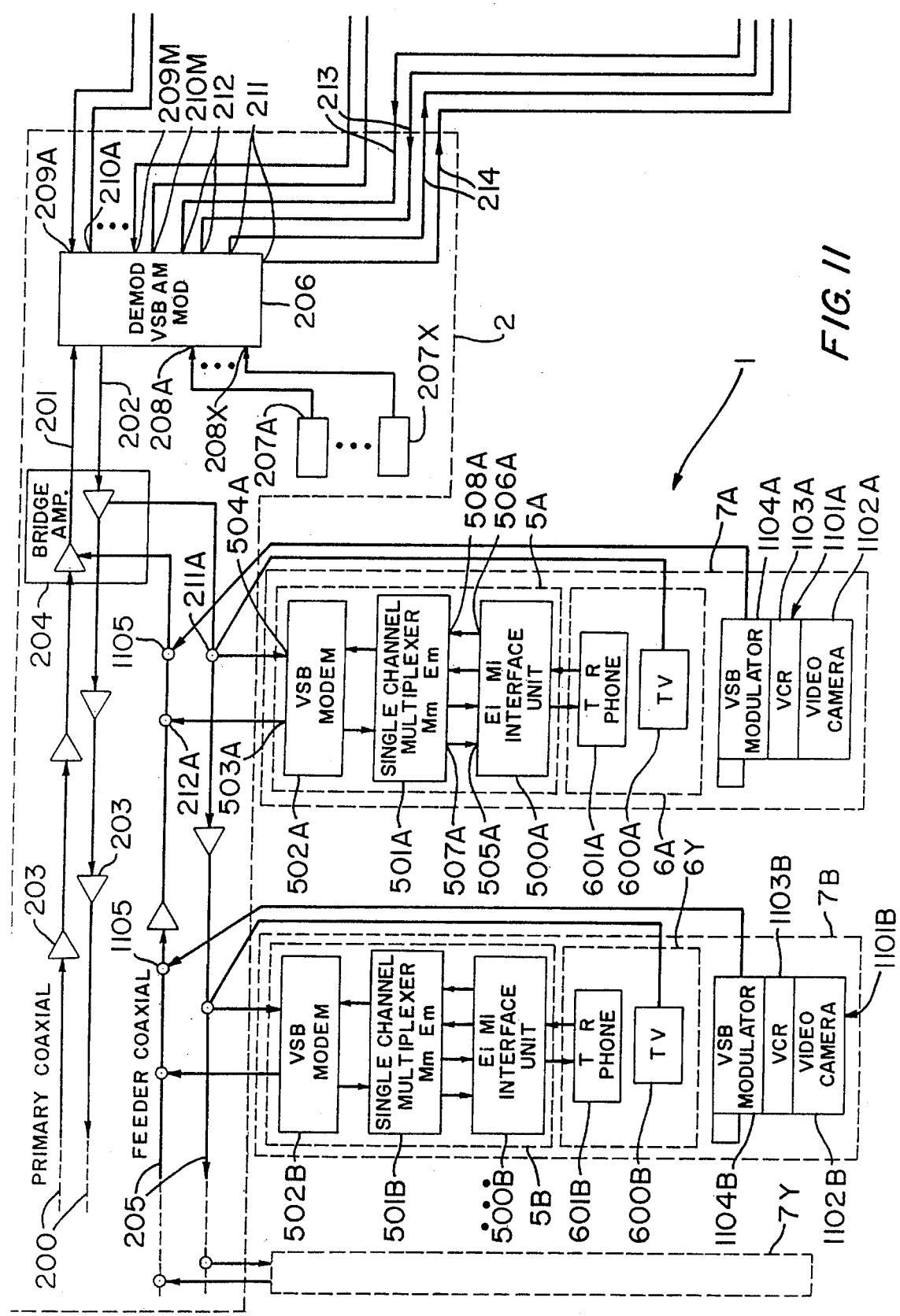
FIGS. 11 and 12 show the subscriber location end of FIG. 1A and the switch end of FIG. 1B of the video and voice distribution system of the '751 application modified in accordance with the principles of the present invention.
Figure 12:
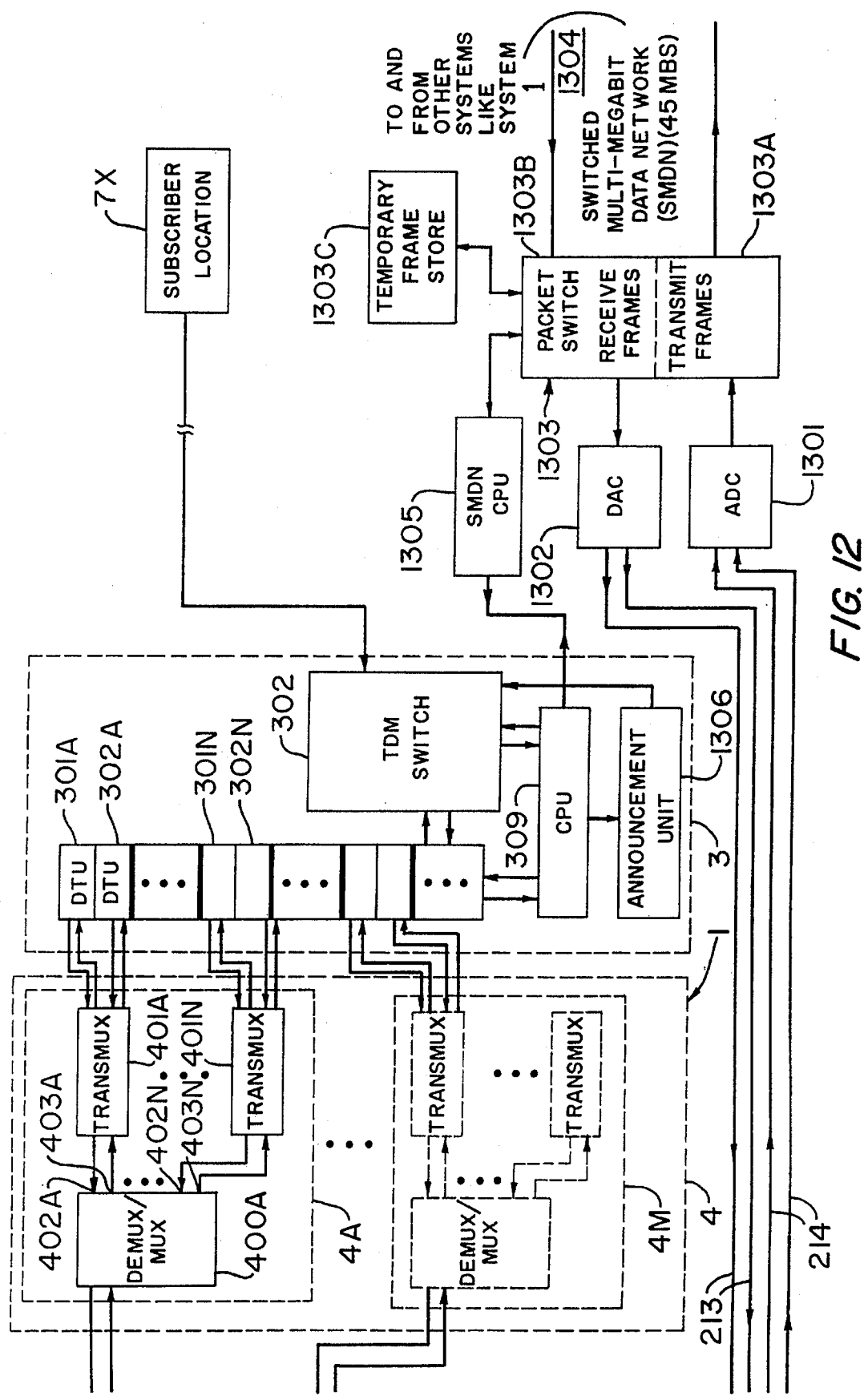

In order to provide additional flexibility for video signal transmission on the system 1, the system in further adapted, in accordance with the principles of the present invention, such that video signals generated at a source subscriber location of the system 1 can be carried to a destination subscriber location on the system 1, or to a destination subscriber location on another like system coupled to the system 1. FIGS. 11 and 12 show the system 1 components of FIGS. 1A and 1B, respectively, modified to realize this additional video capability.

More particularly, as shown in FIG. 11, the subscriber locations 7A–7Y are adapted to include tunable video signal generators 1101A–1101Y, respectively. These generators include video cameras 1102A–1102Y, video camera recorders (VCRs) 1103A–1103Y, and tunable VSB modulators 1104A–1104Y.

The video camera and VCR at a given subscriber location permit live and recorded baseband video signals to be generated at the location. These generated video signals are then coupled from the respective generating unit to the tunable VSB modulator (1104) at the respective location. The VSB modulator, in turn, modulates the signals onto the RF broadband video channel to which it is tuned and which is one of the video channels assigned or allocated by the system 1 to carry subscriber generated video.

The RF broadband video channels of the video channel group A to Q assigned to carry subscriber generated video signals will depend upon the expected subscriber video traffic. Typically, three RF broadband video channels (e.g., channels A–C in the present case) might be initially allocated with the number increasing as demand increases.

The subscriber video RF broadband channels upon receipt of video signals from the respective VSB modulators 1104 via drops 1105 carry these signals upstream on the cable network 2 to the VSB modulator/demodulator 206 at the digital switch end of the system. These channels also carry subscriber video signals received at the modulator/demodulator 206 downstream to the subscriber locations 7A–7Y where they can be viewed on the respective TV's or video receivers 600A–600Y at these locations.

The upstream signals on the subscriber video channels are demodulated to baseband video at the modulator/demodulator 206 and then coupled from the modulator/demodulator 206 via ports 211 (one for each subscriber video RF broadband channel) to respective outgoing video lines 214. The downstream signals from the demodulator/demodulator 206 originate on incoming video lines 213. These lines couple to ports 212 (one for each subscriber video RF broadband channel) of the modulator/demodulator 206 which upon receipt of the baseband signals modulates them onto the appropriate subscriber video RF broadband channel for downstream transmission to the subscriber locations.

To accomodate transmission of the subscriber generated video signals and the appropriate coupling of these signals to subscriber locations within the system 1 and to subscriber locations in like systems coupled to the system 1, the system 1 at the digital switch 3, is additionally provided with an analog-to-digital converter (ADC) 1301 and a digital-to-analog converter (DAC) 1302. These converters are connected, respectively, to the outgoing video lines 214 and the incoming video lines 213 of the modulator/demodulator 206.

The output of ADC 1301 is fed to a video frame transmit section 1303A of a packet switch 1303. A video receive frame section 1303B of the packet switch 1303 couples its output to the DAC 1302.

The packet switch section 1303A either couples frames back to the receive section 1303B, if the video frames are to be supplied to a destination subscriber location on the system 1, or it couples frames to a switched multi-megabit data network (SMDN) 1304 (shown as a 45 Mbs network), if the video frames are to be supplied to other systems like the system 1 and having similar characteristics and subscriber locations. The packet switch section 1303B, in turn, receives video frames from the section 1303A or from the SMDN 1304, the latter video frames having been carried by the SMDN from the other like systems served by the SMDN.

A SMDN CPU 1305 controls operation of the packet switch sections and also communicates with the CPU 309 of the digital switch 3. The latter switch is also provided with an announcement unit 1306 which is used as an aid in the transmission of the subscriber generated video signals. A temporary video frame store 1303C is also used as part of the packet switch 1303 to provide synchronization in the transmission and reception of video frames.

Operation of the modified system 1 of FIGS. 11 and 12 in transmitting subscriber video signals from one subscriber location to another in the same or other like systems is as follows. When a subscriber at a subscriber location desires to generate and transmit video signals to another subscriber at another subscriber location, the subscriber location wishing to transmit (the "source subscriber location") first transmits on its transmit RF voice channel a code or signal indicating a desire to send video. This signal is carried upstream on the appropriate RF broadband voice channel and is converted to a corresponding digital signal which is fed to the digital switch 3.

At the switch 3, the CPU 309 recognizes the code and identifies the source subscriber location as requesting video transmission. The CPU 309 then checks the busy/idle status of all the subscriber video RF broadband channels, i.e., those RF broadband channels assigned to carry subscriber video. If no channels are idle the CPU 309 transmits a busy signal back to the source subscriber location indicating no channels are available for sending video.

If an idle channel is found by the CPU 309, it then sends back, via its announcement unit 1306, over the appropriate RF receive voice channel of the source subscriber location, the identity of the idle RF broadband channel. With this information, the CPU 309 also sends a request to the source subscriber location to tune its VSB modulator 1104 to this idle video channel. Additionally, the CPU 309 requests the source subscriber location to now send via its RF voice transmit channel, the address of the subscriber location which is to receive the video signal, i.e., the "destination subscriber location".

The CPU 309 receives the address of the destination subscriber location on the RF transmit channel of the source subscriber location and communicates it to the SMDN CPU 1305. The CPU 1305 stores this address information for later use when controlling the transmission by the packet switch 1303 of the digitized video signals to the destination subscriber location. Once the source subscriber location sends the address information and it is properly stored at the CPU 1305, the CPU 309 announces to the source subscriber location that video transmission can be started.

The source subscriber location upon receiving this announcement then transmits its video signal, via either its video camera for live video or its VCR for recorded video, to the respective VSB modulator 1104. The VSB modulator modulates this baseband video signal onto the assigned subscriber video RF broadband channel which carries the video signal to modulator/demodulator 206. The latter demodulates the signal to baseband video and outputs the baseband video signal to the outgoing video line 214 associated with the assigned subscriber video RF channel.

The baseband video signal is then carried by the respective line 214 to ADC 1301 where it is digitized and sent to the packet switch video frame transmit section 1303A. In the section 1303A, the digitized signal is arranged into packets of standard video frames. These frames are also supplied by the SMDN CPU 1305 with address of the destination subscriber location. The video frames with the address information are then transmitted to the section 1303B, if the destination subscriber location is on the network 2 of the system 1, or over the SMDN network 1304 for receipt by the receive video frame packet switch section 1303B of another system, if the destination subscriber location is on such other system.

The frame receive section 1303B of the packet switch 1303 upon receiving incoming video frames first recovers therefrom the address of the destination subscriber location. This address information is then transmitted to the SMDN CPU 1305 which, in turn, transmits it to the CPU 309 of the switch 3. The CPU 309 then determines the idle/busy status of the RF voice channel of the destination subscriber location. It also checks the idle/busy status of the subscriber video RF broadband channels. If the destination subscriber location RF voice channel is busy or there are no idle subscriber video RF broadband channels, or if necessary, for synchronization or other purposes, the video frames may be temporarily stored in the store 1303C.

When the subscriber voice channel is or becomes idle and there is an idle video subscriber RF broadband channel, the CPU 309 then assigns the idle video channel to the destination subscriber location and calls the destination subscriber location on the RF voice channel. Upon the destination location answering this call, the CPU sends an announcement to the location advising of the incoming subscriber video and requesting that the destination subscriber location tune its respective video receiver 600 to the assigned video channel. The CPU 309 then signals the SMDN CPU 1305 that the frames of the incoming video from the source subscriber location can now be sent.

This occurs via the receive video frame section 1303B, the DAC 1302, the respective video line 213 and the respective input 212 of the modulator/demodulator 206. The latter modulates the video signals onto the assigned subscriber video RF broadband channel. This channel and the video signals are then received by the destination subscriber location, since it is now tuned to this channel.

With the system 1 of the invention modified as above-described, it thus becomes possible for a subscriber at a subscriber location to transmit video generated at the subscriber location to a subscriber at another subscriber location in the same system 1 or a like system coupled to the system 1. The system 1 can thus be used for a myriad of purposes where video is desired to be transmitted on a subscriber-to-subscriber basis.

It should be noted that in order to ensure that only a destination subscriber location receives the video signal being sent to that location, exclusive of the other subscriber locations connected to the cable network, the system 1 can be further adapted such that the video receivers at the subscriber locations are locked-out or blocked from receiving on the subscriber video RF broadband channels, unless the address of the subscriber location accompanies the video signals in a channel. The system 1 can be adapted in this manner similar to traditional pay-TV cable networks, wherein subscriber locations are locked-out or blocked from certain video channels, unless the address of the subscriber location appears with the video signal in the channel.

In the system of FIG. 1, this is effected by the CPU 309 and the CPU 1305. These units cause the address of the destination subscriber location to be in the assembled video frames and, hence, to be able to be recoverable therefrom for transmission along with the video signals in the assigned subscriber video RF broadband channel. The video receiver at the destination subscriber location recognizes this address, thereby unlocking the receiver so it can receive the video signal.

In all cases it is understood that the above-described arrangements are merely illustrative of the many possible specific embodiments which represent applications of the present invention. Numerous and varied other arrangements, can be readily devised in accordance with the principles of the present invention without departing from the spirit and scope of the invention.

What is claimed:

1. A system comprising:

a plurality of telephone subscriber locations, each telephone subscriber location including: means for establishing a radio frequency ("RF") transmitting channel and a RF receiving channel associated with the subscriber location for conveying signalling and voice information from and to respectively, the subscriber location; tunable video generating means for generating video signals on a subscriber video RF broadband channel to which said tunable video generating means is tuned; tunable video receiving means for receiving video signals on a subscriber video RF broadband channel to which said tunable video receiving means is tuned;

the RF transmitting channels of said subscriber locations forming one or more transmitting frequency-division-multiplexed signals and the RF receiving channels of said subscriber locations forming one or more receiving frequency-division-multiplexed signals;

the subscriber video RF broadband channels on which video signals are to be generated at said subscriber locations forming with said one or more transmitting frequency-division-multiplexed signals a first composite frequency-division-multiplexed signal and the subscriber video RF broadband channels on which video signals are to be received at said subscriber locations forming with said one or more receiving frequency-division-multiplexed signals a second composite frequency-division-multiplexed signal;

a broadband cable network for carrying the first composite frequency-division-multiplexed signal and the second composite frequency-division-multiplexed signal;

and a central switch means responsive to said cable network: for enabling each RF transmitting channel in the first composite frequency-division-multiplexed signal on the cable network to be selectively coupled to any of the RF receiving channels in the second composite frequency-division-multiplexed signal on the cable network; for enabling a particular subscriber video RF broadband channel to be assigned to a subscriber location which is to transmit video signals.; and for enabling a particular subscriber video RF broadband channel to be assigned to a subscriber location which is to receive video signals.

2. A system in accordance with claim 1 wherein:

said cable network includes modulating/demodulating means for recovering baseband video signals from said subscriber video RF broadband channels and for placing baseband video signals onto said subscriber video RF broadband channels;

and said system further comprises conversion and transmission means communicating with said modulating/demodulating means and said central switch means for: receiving video baseband signals recovered by said modulating/demodulating means and converting said video baseband signals to digital video frames; and converting digital video frames to baseband video signals for coupling to said modulating/demodulating means.

3. A system in accordance with claim 2 further comprising:

a multi-megabit data network for coupling digital video frames to and from said conversion and transmission means.

4. A system in accordance with claim 2 wherein:

said central switch means is further for: receiving coded messages from a subscriber location over the RF transmitting channel of the subscriber location indicative of the subscriber location desiring to transmit video signals; transmitting to the subscriber location the identity of an idle subscriber video RF broadband channel to which the subscriber location can tune its tunable video signal generator for transmitting video signals and requesting the address of the destination subscriber location to which the subscriber location is to transmit the video signals; and advising the conversion and transmission means of the destination address of the subscriber location to which video signals from a subscriber location are to be transmitted.

5. A system in accordance with claim 4 wherein:

said conversion means includes said destination address in the video frames formed from the video signals from a subscriber location.

6. A system in accordance with claim 5 wherein:

said central switch is further for: receiving from said conversation and transmission means the destination address of a destination subscriber location to which the video frames at the conversion and transmission means are to be transmitted; when the subscriber RF receiving channel of the destination subscriber location is idle and a subscriber video RF broadband channel is idle advising the destination subscriber location over the RF receiving channel of the destination subscriber location that video signals are to be transmitted to the destination subscriber location and that the destination subscriber location should tune to the idle subscriber video RF broadband channel to receive the video signals; and instructing the conversion and transmission means to convert the digital video frames to baseband video for coupling to the modulating/demodulating means for modulation onto the idle subscriber video RF broadband channel.

7. A system in accordance with claim 6 wherein:

the tunable receiving means at each subscriber location is blocked from receiving video signals carried on each subscriber video RF broadband channel unless the video signals include the address of the subscriber location;

and said conversion and transmission in converting the digital video frames to baseband video for coupling to the modulating/demodulating means includes the destination address of the destination subscriber location in the converted signal.

8. A method comprising:

for each of a plurality of telephone subscriber locations, establishing a radio frequency ("RF") transmitting channel and a RF receiving channel associated with the subscriber location for conveying signalling and voice information from and to respectively, the subscriber location; tuning a video generating means for generating video signals or a video receiving means for receiving video signals to a subscriber video RF broadband channel;

the RF transmitting channels of said subscriber locations forming one or more transmitting frequency-division-multiplexed signals and the RF receiving channels of said subscriber locations forming one or more receiving frequency-division-multiplexed signals;

the subscriber video RF broadband channels on which video signals are to be generated at said subscriber locations forming with said one or more transmitting frequency-division-multiplexed signals a first composite frequency-division-multiplexed signal and the subscriber video RF broadband channels on which video signals are to be received at said subscriber locations .forming with said one or more receiving frequency-division-multiplexed signals a second composite frequency-division-multiplexed signal;

carrying the first composite frequency-division-multiplexed signal and the second composite frequency-division signal on a broadband cable network;

and using a central switch means: to enable each RF transmitting channel in the first composite frequency-division-multiplexed signal on the cable network to be selectively coupled to any of the RF receiving channels in the second composite frequency-division-multiplexed signal on the cable network; to enable a particular subscriber video RF broadband channel to be assigned to a subscriber location which is to transmit video signals; and to enable a particular subscriber video RF broadband channel to be assigned to a subscriber location which is to receive video signals.

9. A method in accordance with claim 8 wherein:

said step of carrying includes demodulating the signals on the subscriber video broadband RF channels for recovering baseband video signals from said subscriber video RF broadband channels and modulating baseband video signals for placing said video signals onto said subscriber video RF broadband channels;

and said method further comprises:

receiving video baseband signals recovered by said demodulating step and converting said video baseband signals to digital video frames; and converting video digital frames to baseband video signals for processing by said modulating step.

10. A method in accordance with claim 9 wherein:

said central switch means is further used to: receive coded messages from a subscriber location over the RF transmitting channel of the subscriber location indicative of the subscriber location desiring to transmit video signals; transmit to the subscriber location the identity of an idle subscriber video RF broadband channel to which the subscriber location can tune its tunable video signal generator for transmitting video signals and requesting the address of the destination subscriber location to which the subscriber location is to transmit the video signals; and to supply for use in said demodulating and converting step the destination address of the subscriber location to which video signals from a subscriber location are to be transmitted.

11. A method in accordance with claim 10 wherein:

said receiving and converting step includes said destination address in the video frames formed from the video signals from a subscriber location.

12. A method in accordance with claim 11 wherein:

said central switch is further used to: receive from said step of converting the destination address of a destination subscriber location to which the converted video frames are to be transmitted; when the subscriber RF receive channel of the destination subscriber location is idle and a subscriber video RF broadband channel is idle advising the destination subscriber location over the RF receive channel of the destination subscriber location that video signals are to be transmitted to the destination subscriber location and that the destination subscriber location should tune to the idle subscriber video RF broadband channel to receive the video signals; and instructing the converting step to convert the digital video frames to baseband video for modulation onto the idle subscriber video RF broadband channel.

13. A method in accordance with claim 12 further comprising:

blocking the video receiving means at each subscriber location from receiving a video RF broadband channel, unless the video signals in the channel include the address of the subscriber location;

and said converting step includes providing the destination address of the destination subscriber location in the converted signal.

14. Apparatus for use with a telephone subscriber location, the telephone subscriber location being used with other telephone subscriber locations and with a broadband cable network for carrying a first composite frequency-division-multiplexed signal and a second composite frequency-division-multiplexed signal, the first composite frequency-division-multiplexed signal being formed from video radio frequency ("RF") broadband channels on which subscriber video signals are to be generated and one or more transmitting frequency-division-multiplexed signals formed from RF transmitting channels of said subscriber locations and the second composite frequency-division-multiplexed signal being formed from subscriber video RF broadband channels on which subscriber video signals are to be received and one or more receiving frequency-division-multiplexed signals formed from RF receiving channels of said subscriber locations, the apparatus being further used with a central switch means for enabling each RF transmitting channel in the first composite frequency-division-multiplexed signal on the cable network to be selectively coupled to any of the RF receiving channels in the second composite frequency-division-multiplexed signal on the cable network and for enabling a particular subscriber video RF broadband channel to be assigned to the subscriber location which is to transmit video signals and for enabling a particular subscriber video RF broadband channel to be assigned to a subscriber location which is to receive video signals, the apparatus comprising:

means establishing a RF transmitting channel and a RF receiving channel associated with the subscriber location for conveying signalling and voice information from and to, respectively, the subscriber location;

tunable video generating means for generating video signals on a subscriber video RF broadband channel to which said tunable video generating means is tuned;

and means for use in coupling said apparatus to said cable network.

15. Apparatus in accordance with claim 14 further comprising:

tunable video receiving means for receiving video signals on a subscriber video RF broadband channel to which said tunable video receiving means is tuned.

16. Apparatus in accordance with claim 15 further comprising:

means for generating a coded signal in the RF transmitting channel associated with the subscriber location indicating that the subscriber location wishes to transmit video signals.

17. Apparatus for use with a plurality of telephone subscriber locations, each telephone subscriber location including: means for establishing a radio frequency ("RF") transmitting channel and a RF receiving channel associated with the subscriber location for conveying signalling and voice information from and to respectively, the subscriber location; tunable video generating means for generating video signals on a subscriber video RF broadband channel to which said tunable video generating means is tuned; and tunable video receiving means for receiving video signals on a subscriber video RF broadband channel to which said tunable video receiving means is tuned; the RF transmitting channels of said subscriber locations forming one or more transmitting frequency-division-multiplexed signals and the RF receiving channels of said subscriber locations forming one or more receiving frequency-division-multiplexed signals; the subscriber video RF broadband channels on which video signals are to be generated at said subscriber locations forming with said one or more transmitting frequency-division-multiplexed signals a first composite frequency-division-multiplexed signal and the subscriber video RF broadband channels on which video signals are to be received at said subscriber locations with said one or more receiving frequency-division-multiplexed signals a second composite frequency-division-multiplexed signal; and said apparatus being for further use with a broadband cable network for carrying the first composite frequency-division-multiplexed signal and the second composite frequency-division-multiplexed signal; the apparatus comprising:

a central switch means responsive to said cable network: for enabling each RF transmitting channel in the first composite frequency-division-multiplexed signal on the cable network to be selectively coupled to any of the RF receiving channels in the second composite frequency-division-multiplexed signal on the cable network; for enabling a particular subscriber video RF broadband channel to be assigned to a subscriber location which is to transmit video signals; and for enabling a particular subscriber video RF broadband channel to be assigned to a subscriber location which is to receive video signals.

18. Apparatus in accordance with claim 17 wherein:

said cable network includes modulating/demodulating means for recovering baseband video signals from said subscriber video RF broadband channels and for placing baseband video signals onto said subscriber video RF broadband channels;

and said apparatus further comprises conversion and transmission means adapted to communicate with said modulating/demodulating means and said central switch means for: receiving video baseband signals recovered by said modulating/demodulating means and converting said video baseband signals to digital video frames; and converting digital video frames to baseband video signals for coupling to said modulating/demodulating means.

19. Apparatus in accordance with claim 18 further comprising:

a multi-megabit data network for coupling digital video frames to and from said conversion and transmission means.

20. Apparatus in accordance with claim 18 wherein:

said central switch means is further for: receiving coded messages from a subscriber location over the RF transmitting channel of the subscriber location indicative of the subscriber location desiring to transmit video signals; transmitting to the subscriber location the identity of an idle subscriber video RF broadband channel to which the subscriber location can tune its tunable video signal generator for transmitting video signals and requesting the address of the destination subscriber location to which the subscriber location is to transmit the video signals; and advising the conversion and transmission means of the destination address of the subscriber location to which video signals from a subscriber location are to be transmitted.

21. Apparatus in accordance with claim 20 wherein:

said conversion means includes said destination address in the video frames formed from the video signals from a subscriber location.

22. Apparatus in accordance with claim 21 wherein:

said central switch is further for: receiving from said conversation and transmission means the destination address of a destination subscriber location to which the video frames at the conversion and transmission means are to be transmitted; when the subscriber RF receiving channel of the destination subscriber location is idle and a subscriber video RF broadband channel is idle advising the destination subscriber location over the RF receiving channel of the destination subscriber location that video signals are to be transmitted to the destination subscriber location and that the destination subscriber location should tune to the idle subscriber video RF broadband channel to receive the video signals; and instructing the conversion and transmission means to convert the digital video frames to baseband video for coupling to the modulating/demodulating means for modulation onto the idle subscriber video RF broadband channel.

23. Apparatus in accordance with claim 22 wherein:

the tunable receiver means at each subscriber location is blocked from receiving video signals carried on each subscriber video RF broadband channel unless the video signals on the channel include the address of the subscriber location;

and said conversion and transmission means in converting the digital video frames to baseband video for coupling to the modulating/demodulating means includes the destination address of the destination subscriber location in the converted signal.

* * * * *